United States Patent [19]

Lipschutz

[11] Patent Number: 5,345,426
[45] Date of Patent: Sep. 6, 1994

[54] DELAY INTERPOLATOR FOR DIGITAL PHASED ARRAY ULTRASOUND BEAMFORMERS

[75] Inventor: David Lipschutz, Lexington, Mass.

[73] Assignee: Hewlett-Packard Company, Palo Alto, Calif.

[21] Appl. No.: 60,789

[22] Filed: May 12, 1993

[51] Int. Cl.$^5$ .................................................. G01S 7/52
[52] U.S. Cl. ................................... 367/103; 367/123; 128/661.01
[58] Field of Search .............................. 367/103, 123; 128/660.08, 661.01

[56] References Cited

U.S. PATENT DOCUMENTS

| | | | |
|---|---|---|---|
| 4,170,766 | 10/1979 | Pridham et al. | 367/135 |
| 4,213,195 | 7/1980 | Pridham | 367/92 |
| 4,290,127 | 9/1981 | Pridham et al. | 367/123 |
| 4,336,607 | 6/1982 | Hill et al. | 367/123 |
| 4,626,217 | 12/1986 | Tardif et al. | 434/8 |
| 4,688,045 | 8/1987 | Knudsen | 342/377 |
| 4,779,622 | 10/1988 | Nakamura et al. | 128/660.01 |
| 4,787,392 | 11/1988 | Saugeon | 128/661.01 |
| 4,920,521 | 4/1990 | Yoshie | 367/103 |
| 4,969,132 | 11/1990 | Reede | 367/122 |
| 5,088,496 | 2/1992 | Bernard | 128/660.07 |
| 5,191,546 | 3/1993 | Green | 364/723 |

OTHER PUBLICATIONS

R. G. Pridham et al, "A Novel Approach to Digital Beamforming", J. Acoust. Soc. Am. 63(2), Feb. 1978, pp. 425-434.

T. K. Song et al, "A New Digital Phased Array System for Dynamic Focusing and Steering with Reduced Sampling Rate", Ultrasonic Imaging 12, 1-16, 1990.

R. G. Pridham et al, "Digital Interpolation Beamforming for Low-Pass & Bandpass Signals", IEEE Proceedings, vol. 67, No. 6, Jun. 1979, pp. 904-919.

Primary Examiner—Ian J. Lobo

[57] ABSTRACT

A delay interpolator for use in each channel of a digital ultrasound beamformer includes an FIR digital filter that is responsive to delay control information for delaying digital samples of the received beam by different delays that are quantized in increments less than the sampling period and a control unit for supplying the delay control information to the FIR digital filter. In a preferred embodiment, all but one of the filter coefficients are of the form $\frac{1}{2}^m$, where m is an integer, and multiplication is implemented in the FIR digital filter by shifting bits of the data samples by m bit positions. The FIR digital filter preferably includes a gain correction multiplier for correcting the gain of the delayed digital samples. The FIR digital filter delay interpolator can utilize a pipeline structure for high speed operation. In addition, the FIR digital filter delay interpolator can be used in a time multiplexed beamformer to process several beams simultaneously.

13 Claims, 4 Drawing Sheets

DELAY INTERPOLATOR FOR DIGITAL PHASED ARRAY ULTRASOUND BEAMFORMERS

FIELD OF THE INVENTION

This invention relates to ultrasound imaging systems which utilize phased array beam steering and focusing and, more particularly, to a delay interpolator for use in each channel of a digital phased array beamformer.

BACKGROUND OF THE INVENTION

In a phased array ultrasound imaging system, an ultrasound transducer comprises an array of transducer elements. The system includes n parallel channels, each having a transmitter and a receiver connected to one of the transducer array elements. Each transmitter outputs an ultrasound pulse into an object being imaged, typically the human body. The transmitted ultrasound energy is steered and focused by applying appropriate delays to the pulses transmitted from each array element so that the transmitted energy adds constructively at a desired point. The pulse is partially reflected back to the transducer array by various structures and tissues in the body.

Steering and focusing of the received ultrasound energy is effected in a reverse manner. The reflected ultrasound energy from an object typically arrives at the array elements at different times. The received signals are amplified, delayed and then summed in a receive beamformer. The delay for each element is selected such that the received beam is focused at a desired point. The delays may be varied dynamically so as to effect focusing on objects at progressively increasing depths as the ultrasound energy is received.

In a digital receiver, the signal from each array element is digitized by an analog-to-digital converter. The minimum conversion rate, or sampling rate, which is dictated by the Nyquist theorem, is twice the frequency of the highest component frequency in the received signal. Usually, the conversion rate is somewhat greater than the Nyquist requirement in order to permit a practical antialiasing filter.

In a digital ultrasound beamformer, it is straightforward to implement the delay function when the desired delay is an integer multiple of the sampling period. Such delay may be achieved by the use of a FIFO memory, a two port memory, a shift register or a similar memory device. However, it is often desirable to implement delays which are quantized in units smaller than the sampling period in order to obtain highly accurate steering and focusing. For example, assume a 5 MHz phased array transducer having a 100% fractional bandwidth, that is, a spectrum from 2.5 to 7.5 MHz. A sampling rate of 20 MHz satisfies the Nyquist requirement and provides a comfortable guard band for the antialiasing filter. For a 20 MHz sampling rate, a delay quantization of 50 nanoseconds (the sampling period) is easily achieved. However, to obtain a high performance beam plot, a delay quantization of about 12 nanoseconds is desired. It would be very expensive to increase the sampling rate to 80 MHz.

An alternative to increasing the sampling rate is to utilize a delay element that is capable of delays which are quantized in units smaller than the sampling period, thus providing delay interpolation between the sampling period. U.S. Pat. No. 4,170,766, issued Oct. 9, 1979 to Pridham et al., discloses a beamformer wherein signal samples are delayed relative to each other by fractional amounts of the sampling period using charge coupled device registers for storing analog samples. U.S. Pat. No. 4,787,392 issued Nov. 29, 1988 to Saugeon, discloses a technique for delay interpolation in an ultrasound system using two successively received ultrasound signals applied to an interpolator. U.S. Pat. No. 5,088,496, issued Feb. 18, 1992 to Bernard, discloses an ultrasonic imaging system wherein each channel of a beamformer includes a delay line and a circuit for delay interpolation. The circuit for delay interpolation comprises multiple digital filters, each having a different delay, connected in parallel. The output of one of the digital filters is selected to provide the desired delay.

SUMMARY OF THE INVENTION

In accordance with the present invention, a delay interpolator is provided for use in each channel of an ultrasound beamformer. Received signals from the transducer elements of an ultrasound transducer array are converted to digital samples at a sampling rate f. The digital samples are delayed by selected delays, and the delayed digital samples are summed to form a focused received beam. The delay interpolator delays the digital samples in each channel by selected delays that are quantized in increments less than the sampling period $1/f$. The delay interpolator comprises an FIR digital filter including programmable means responsive to delay control information for delaying the digital samples by different delays that are quantized in increments less than the sampling period, and control means responsive to a subdelay control signal representative of a desired delay for supplying the delay control information to the FIR digital filter.

The delay interpolation is typically used with a coarse delay unit that provides delays in multiples of the sampling period. The total delay is the sum of the delays from the coarse delay unit and the delay interpolation.

Preferably, the control means includes means for supplying a set of filter coefficients corresponding to the desired delay. The FIR digital filter preferably comprises multiplier means for multiplying a group of consecutive digital samples by the set of filter coefficients to provide intermediate samples and summing means for summing the intermediate samples to provide an output digital sample.

In a preferred embodiment, all but one of the filter coefficients are of the form $\frac{1}{2}^m$, where m is an integer, and the multiplier means comprises means for shifting the bits of the data samples by m bit positions in response to the control information from the control means. When the coefficients are of this form, conventional digital multipliers are not required to multiply the digital samples by the filter coefficients.

Preferably, the FIR digital filter further includes gain correction means for correcting the gain of the output sample at each selected delay. In a preferred embodiment, the FIR digital filter has selectable delays of 0, $\frac{1}{4}$, $\frac{1}{2}$ and $\frac{3}{4}$ of the sampling period. The control information and the gain correction information are preferably stored in a random access memory that is addressed by the subdelay control signal.

According to another aspect of the invention, the delay interpolator is used in a beamformer that forms two or more time multiplexed beams. In this case, the delay interpolator further includes first means for storing a group of first consecutive digital samples representative of a first beam, second means for storing a group of second consecutive digital samples representative of a second beam and selector means for sequentially supplying the first digital samples and the second digital samples to the FIR digital filter such that the FIR digital filter performs time multiplexed processing of digital samples of the first beam and the second beam.

According to a further aspect of the invention, an ultrasound beamformer for processing received signals from an array of ultrasound transducer elements comprises a plurality of processing channels, one coupled to each transducer element of the array. Each processing channel comprises digitizing means for converting the received signal to digital samples at a predetermined sampling rate f, and delay means for delaying the digital samples by predetermined delays to provide delayed digital samples. The delay means comprises a delay interpolator including an FIR digital filter having programmable means responsive to delay control information for delaying the digital samples by different delays that are quantized in increments less than the sampling period. The ultrasound beamformer further includes summing means for summing the delayed digital samples to form output samples that are representative of a received beam, and control means for supplying the delay control information to the delay means in each of the processing channels.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
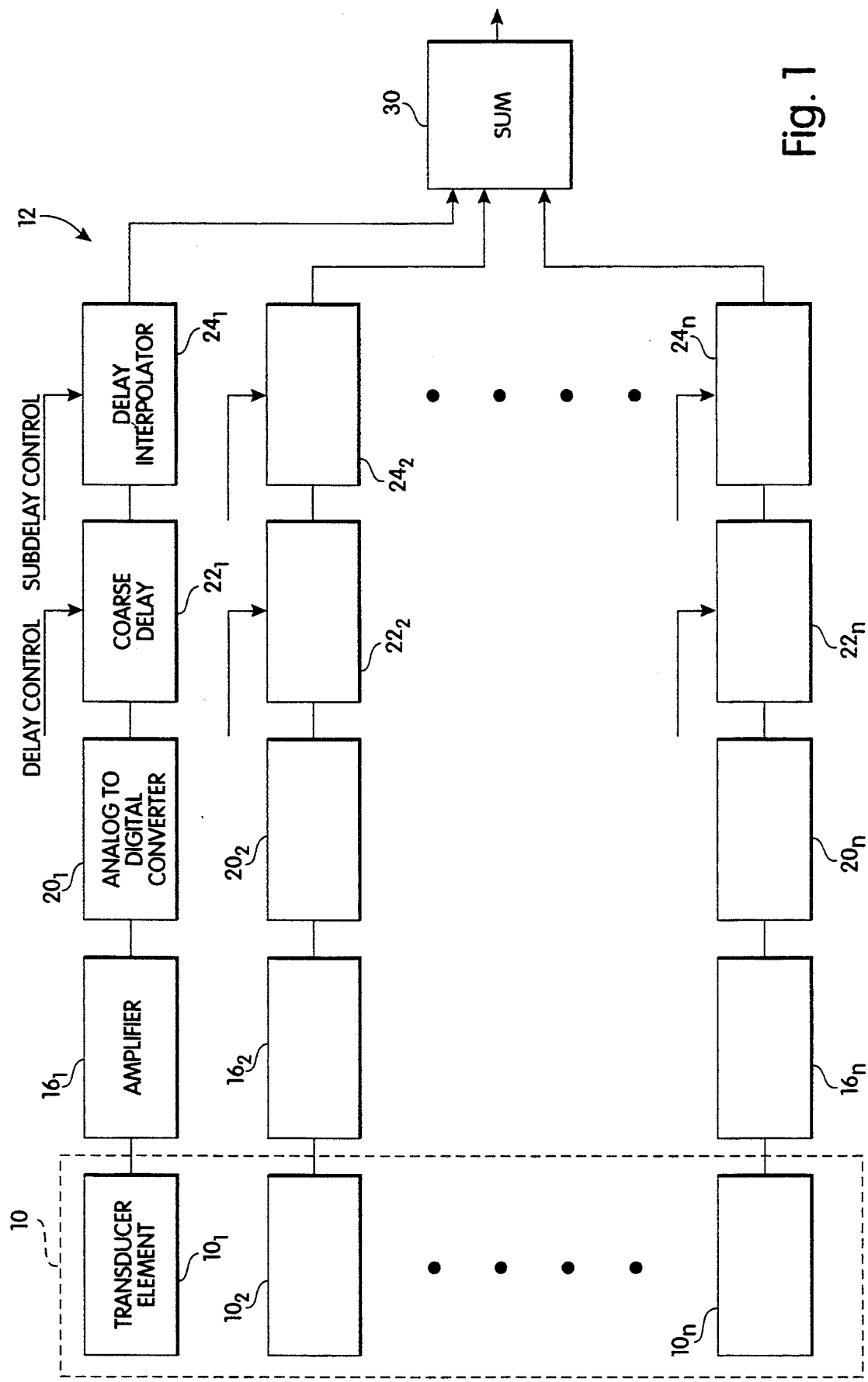
FIG. 1 is a block diagram of a digital phased array ultrasound beamformer in accordance with the present invention.

A simplified block diagram of an ultrasound transducer array and a digital phased array beamformer is shown in FIG. 1. A phased array ultrasound transducer 10 includes transducer elements $10_1$, $10_2$, ... $10_n$. The transducer elements are typically arranged in a linear or curvilinear array. The ultrasound transducer 10 typically includes up to 128 transducer elements.

The ultrasound transducer 10 transmits ultrasound energy into an object being imaged and receives reflected ultrasound energy. In a medical ultrasound imaging system, reflections are received from various structures and organs within the human body. The transmitter portion of the imaging system is omitted from FIG. 1 for simplicity. However, a transmitter is connected to each transducer element through a receiver/protector switch, as known in the art. By appropriately delaying the pulses applied to each transducer element, a focused ultrasound beam is transmitted into the patient. The transmitted beam is focused and steered by varying the delays associated with each transducer element.

The reflected ultrasound energy from a given point within the patient's body is received by the transducer elements at different times. Each of the transducer elements $10_1$, $10_2$, ... $10_n$ converts the received ultrasound energy to an electrical signal which is supplied to a receive beamformer 12. The beamformer 12 processes the electrical signals to effect focusing and steering of the received ultrasound energy. The beamformer 12 converts the received ultrasound energy into a focused received beam. The depth and direction of the focal point relative to the ultrasound transducer 10 can be varied dynamically with time by appropriately varying the delays applied to the received signals from each of the transducer elements. The beamformer 12 includes a separate processing channel for each transducer element.

The respective electrical signals from transducer elements $10_1$, $1_{-2}$, ... $10_n$ are amplified by amplifiers $16_1$, $16_2$, ... $16_n$. The amplified signals are digitized by analog-to-digital converters $20_1$, $20_2$, ... $20_n$ to provide digital samples representative of the received analog signals from each transducer element. The analog signals are sampled at a predetermined sampling rate f. The sampling rate depends on the frequency content of the received signals and is selected to satisfy the Nyquist theorem. For example, for an ultrasound transducer 10 that operates at 5 MHz and has a 100% fractional bandwidth, the received signal has a spectrum from 2.5 MHz to 7.5 MHz. The Nyquist theorem requires that the sampling rate be at least twice the highest frequency component (7.5 MHz). As noted above, the sampling rate is usually made higher than the Nyquist requirement to permit a practical antialiasing filter. In the present example, a sampling rate of 20 MHz meets these requirements. In this example, the sampling period 1/f, the time between sampling pulses, is 50 nanoseconds.

The digital samples from analog to digital converters $20_1$, $20_2$, ... $20_n$ are input to delay units which apply a desired time delay to each digital sample. The delay units include a coarse delay $22_1$, $22_2$, ... $22_n$ and a delay interpolator $24_1$, $24_2$, ... $24_n$ for each channel. The coarse delay delays each digital sample by a selected delay that is an integer multiple of the sampling period 1/f. The delay interpolator delays each digital sample by a selected delay that is quantized in units less than the sampling period 1/f. For example, the delay interpolator can provide a delay of 0, $\frac{1}{4}$, $\frac{1}{2}$, or $\frac{3}{4}$ of the sampling period. Thus, the total delay of each digital sample is quantized in increments less than the sampling period without increasing the sampling rate beyond that which is required to meet the Nyquist requirement with a suitable guard band. Each of the coarse delays $22_1$, $22_2$, ... $22_n$ is controlled by a delay control signal, and each delay interpolator $24_1$, $24_2$, ... $24_n$ is controlled by a subdelay control signal. The delay control signal and the subdelay control signal are provided from focal delay generators (not shown) in response to a set of coefficients which represent a predetermined pattern of beam steering and focusing. The delayed digital samples from delay interpolators $24_1$, $24_2$, ... $24_n$ are applied to a summing unit 30. The output of summing unit 30 is a digital sample that is representative of the received signal strength from the point where the beamformer 12 is focused at that instant of time. The output samples of the beamformer are processed in the remainder of the ultrasound imaging system to produce an image of the region under examination in accordance with known techniques.

It will be understood that the circuitry associated with each transducer element, including amplifier 16, analog-to-digital converter 20, coarse delay 22 and delay interpolator 24, constitutes a processing channel that is repeated for each transducer element in the transducer array.

Figure 2:
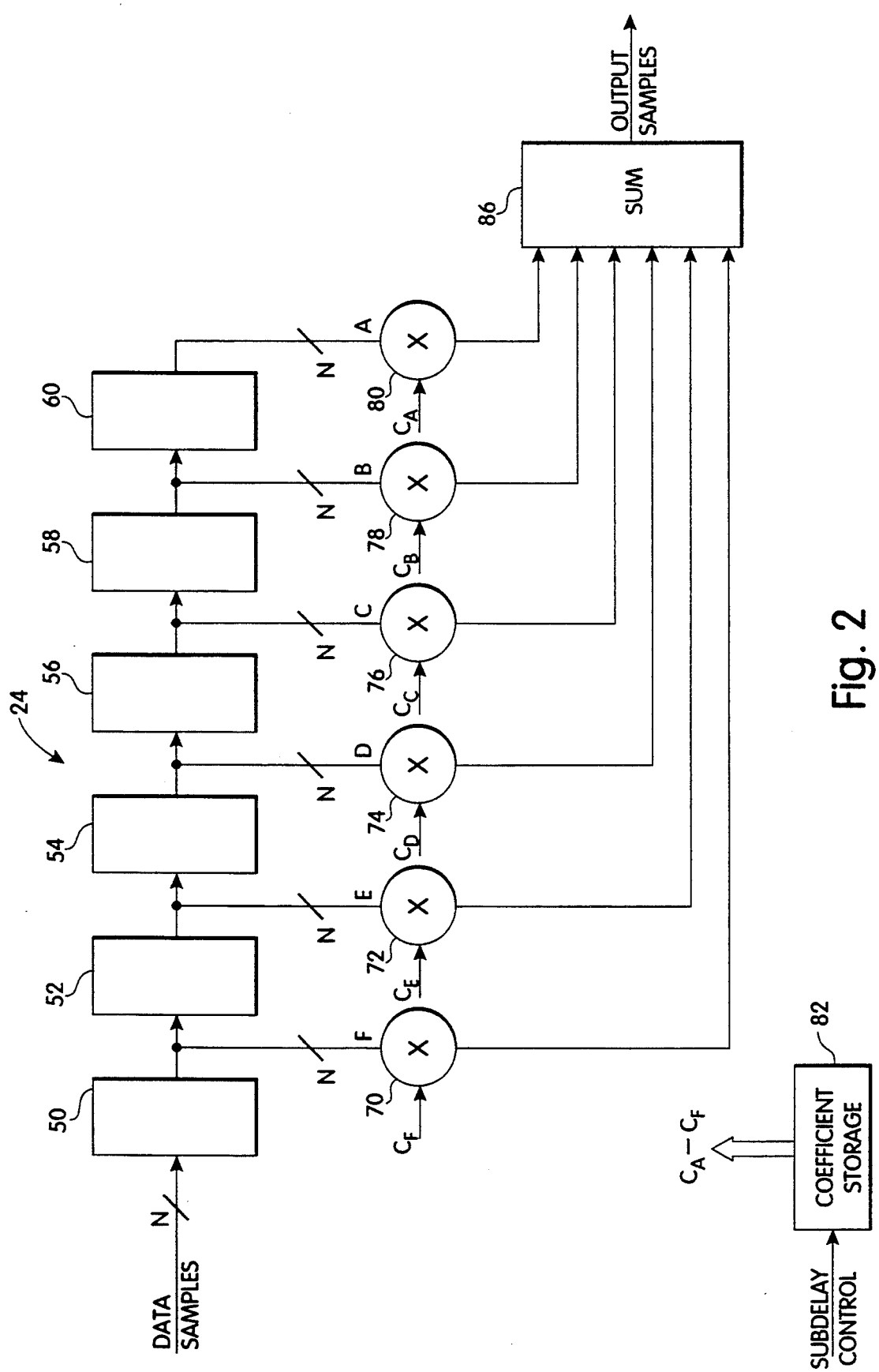
FIG. 2 is a block diagram of a delay interpolator in accordance with the present invention.

In accordance with the present invention, the delay interpolator in each channel comprises a finite impulse response (FIR) digital filter having different selectable delays that are quantized in delays less than the sampling period. A block diagram of a preferred embodiment of delay interpolator 24 is shown in FIG. 2. One delay interpolator 24 is required for each channel of the beamformer 12. The FIR digital filter is designed to have a flat amplitude response and a linear delay as a function of frequency. Different delays are obtained by applying different filter coefficients to the FIR digital filter. The FIR digital filter for delay interpolation in accordance with the invention has an even number of stages and is symmetrical. An example shown in FIG. 2 has six stages. It has been found that a six stage filter provides satisfactory performance when the highest component frequency in the received signal is no more than about ⅜ of the sampling frequency.

The delay interpolator 24 includes registers 50, 52, 54, 56, 58, and 60 connected in series for storage of six consecutive digital data samples will be understood that the digital data samples each have N bits and each of the registers 50, 52, 54, 56, 58, and 60 has capacity for storage of N bits. The registers are clocked in synchronism with the sampling clock so that at any instant of time the registers contain six digital data samples A, B, C, D, E, and F. The outputs of registers 50, 52, 54, 56, 58, and 60 are applied to one of the inputs of multipliers 70, 72, 74, 76, 78, and 80, respectively. Filter coefficients $C_F$, $C_E$, $C_D$, $C_C$, $C_B$, and $C_A$ are applied to the other inputs of multipliers 70, 72, 74, 76, 78, and respectively. The coefficients $C_A$–$C_F$ are stored in a coefficient storage unit 82 which can be a random access memory (RAM). A set of coefficients corresponding to a desired delay is addressed by a subdelay control signal. Each desired delay requires a different set of filter coefficients $C_A$–$C_F$. The outputs of multipliers 70, 72, 74, 76, 78 and 80 are applied to the inputs of a summing unit 86. The outputs of the multipliers are summed to provide an output sample during each cycle of the sampling clock. The multipliers provide outputs simultaneously so that the output sample contains a contribution from six input data samples. During the next clock cycle, the data samples in registers 50, 52, 54, 56, 58 and 60 are shifted by one position, and a new output sample is produced in the same manner.

It will be understood that output samples are not valid until input data samples have been shifted into all of the registers 50, 52, 54, 56, 58 and 60. Thus, the actual delay between the input data samples and the output data samples is an integer multiple of the sampling period plus the desired subdelay of less than the sampling period. The total delay produced by the FIR digital filter is taken into account by reducing the delay of coarse delay 22 by a corresponding amount.

The coefficients to produce delays of 0, ¼, ½ and ¾ of the sampling period are given in Table I below. Table I also includes a gain correction for each delay value. The gain correction is used to correct for the fact that the FIR digital filter gain varies for the different sets of coefficients. As described below, the gain correction can be made by a gain correction multiplier at the output of the delay interpolator.

TABLE I

| DELAY | GAIN CORRECTION | $C_A$ | $C_B$ | $C_C$ | $C_D$ | $C_E$ | $C_F$ |
|---|---|---|---|---|---|---|---|
| 0 | 0.5 | 0 | 0 | 2 | 0 | 0 | 0 |
| ¼f | 1/0.84 | 1/16 | −¼ | 3/2 | ½ | −⅛ | 1/16 |
| ½f | 1/0.79 | 1/16 | −¼ | 1 | 1 | −¼ | 1/16 |
| ¾f | 1/0.84 | 1/16 | −⅛ | ½ | 3/2 | −¼ | 1/16 |
| ½f (Hiband) | | ⅛ | −¼ | 1 | 1 | −¼ | ⅛ |

It will be understood that the FIR digital filter of the delay interpolator 24 can have a different number of stages than shown in FIG. 2 and can provide more or fewer selectable subdelays. In these cases, different filter coefficients are utilized.

The configuration of the delay interpolator 24 shown in FIG. 2 and described above provides satisfactory performance. However, a significant reduction in circuitry is obtained by observing that most of the coefficients $C_A$–$C_F$ in Table I are of the form $½^m$, where m is an integer. This permits the multipliers 70, 72, 74, 76, 78 and 80 shown in FIG. 2 to be replaced with much simpler circuitry. This simplification is particularly important in the beamformer 12 wherein the delay interpolator 24 is replicated in each of n channels.

Figure 3:
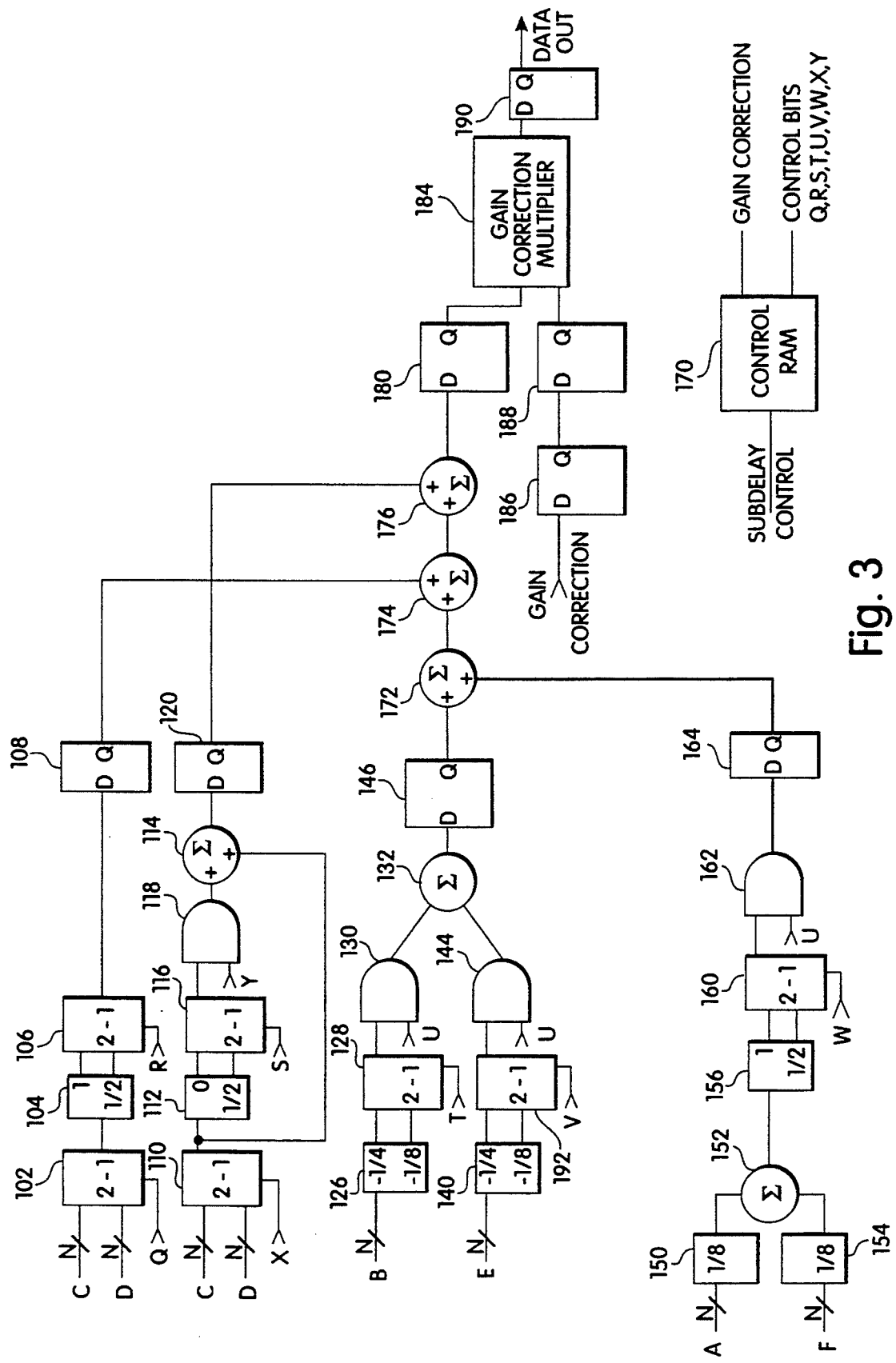
FIG. 3 is a block diagram of a preferred embodiment of the delay interpolator in accordance with the present invention.

A block diagram of a preferred embodiment of the simplified FIR filter for delay interpolation is shown in FIG. 3. The multipliers of FIG. 2 are replaced by a series of multiplexers and bit shifters. The multiplexers are controlled by control bits rather than filter coefficients. However, the circuits of FIGS. 2 and 3 produce the same result.

The registers 50, 52, 54, 56, 58 and 60 shown in FIG. 2 for storing input data samples are omitted from FIG. 3 for simplicity, but are required to provide input data samples to the FIR digital filter. The C and D data samples are supplied to the respective inputs of a 2:1 multiplexer 102. Multiplexer 102 and the other multiplexers shown in FIG. 3 and described below have N bits per input and an N bit output, where N is the number of bits in the digital data sample. The multiplexer 102 is controlled by a Q control bit. The output of multiplexer 102 is supplied to a bit shifter 104. The bit shifter 104 provides a times 1 output and a times ½ output to the respective inputs of a multiplexer 106. The multiplexer 106 is controlled by an R control bit. The output of multiplexer 106 is supplied to a register 108.

The bit shifter 104 and the other bit shifters shown in FIG. 3 are implemented simply by appropriate connections to effect a right shift of the digital data sample. Thus, in bit shifter 104 the times 1 output is provided by connecting the bits of the data sample directly to the input of multiplexer 106 without shifting. The times ½ output is provided by connecting the bits of the data sample to the inputs of multiplexer 106 with a one bit shift to the right. Similarly, for other bit shifters in the circuit, times ¼ is obtained by shifting the bits of the data sample two bits to the right, and times ⅛ is obtained by shifting the bits of the data sample three bits to the right. In general, multiplication by a filter coefficient of the form $½^m$ is implemented by shifting the bits of the data sample m bit positions to the right. Negative values, such as minus ¼, are obtained by a logical inversion of the bits of the data sample and a shift to the right by the appropriate number of bits.

The C and D data samples are supplied to the respective inputs of a multiplexer 110 which is controlled by an X control bit. The output of multiplexer 110 is supplied to a bit shifter 112 and to one input of a summing unit 114. The bit shifter 112 supplies a times 0 output and a times ½ output to the respective inputs of a multiplexer 116. The multiplexer 116 is controlled by an S control bit. The times 0 output of bit shifter 112 indicates that all zero bit values are supplied to one of the inputs of multiplexer 116. The output of multiplexer 116 is ANDed with a Y control bit in an AND gate 118. In actual implementation, the AND gate 118 comprises N gates for ANDing the N bits of the data sample with the Y control bit. The output of gate 118 is supplied to the other input of summing unit 114. The output of summing unit 114 is supplied to a register 120.

The B data samples are supplied to a bit shifter 126 which provides times minus ¼ and times minus ⅛ outputs to the respective inputs of a multiplexer 128. The multiplexer 128 is controlled by a T control bit. The output of multiplexer 128 is ANDed with a U control bit in an N bit AND gate 130. The output of gate 130 is supplied to one input of a summing unit 132.

The E data samples are supplied through a bit shifter 140 which provides times minus ¼ and times minus ⅛ outputs to the respective inputs of a multiplexer 142. The multiplexer 142 is controlled by a V control bit. The output of multiplexer 142 is ANDed with the U control bit in an N bit AND gate 144. The output of AND gate 144 is supplied to the other input of summing unit 132. The output of summing unit 132 is supplied to a register 146.

The A data samples are supplied to a bit shifter 150 which provides a times ⅛ output to one input of a summing unit 152. The F data samples are supplied to a bit shifter 152 which provides a times ⅛ output to the other output of the summing unit 152. The output of summing unit 152 is supplied to a bit shifter 156 which provides times 1 and times ½ outputs to the respective inputs of a multiplexer 160. Multiplexer 160 is controlled by a W control bit. The output of multiplexer 160 is ANDed with the U control bit in an N bit AND gate 162. The output of AND gate 162 is supplied to a register 164.

The multiplexers 102, 106, 110, 116, 128, 142 and 160, the bit shifters 104, 112, 126, 140, 150, 154 and 156, the summing units 114, 132 and 152 and the AND gates 118, 130, 144 and 162 implement multiplication of the input data samples A, B, C, D, E and F by the coefficients $C_A$, $C_B$, $C_C$, $C_E$ and $C_F$, respectively, as shown in Table I, without the use of multipliers, The control bits Q, R, S, T, U, V, W, X and Y are stored in a control RAM 170 which is addressed by the subdelay control signal. The control bits to implement delays of 0, ¼, ½ and ¾ of the sampling period with the circuit shown in FIG. 3 are shown in Table II below.

TABLE II

| DELAY | CONTROL BITS | | | | | | | | |
|---|---|---|---|---|---|---|---|---|---|
| | Q | R | S | T | U | V | W | X | Y |
| 0 | 0 | 0 | 0 | 0 | 0 | 0 | 0 | 0 | 0 |
| ¼f | 1 | 1 | 1 | 0 | 1 | 1 | 1 | 0 | 1 |
| ½f | 0 | 0 | 0 | 0 | 1 | 0 | 1 | 1 | 0 |
| ¾f | 0 | 1 | 1 | 1 | 1 | 0 | 1 | 1 | 1 |
| ½f (Hiband) | 0 | 0 | 0 | 0 | 1 | 0 | 0 | 1 | 0 |

The outputs of registers 146 and 164 are summed by a summing unit 172. The output of register 108 and the output of summing unit 172 are summed by a summing unit 174. The output of register 120 and the output of summing unit 174 are summed by a summing unit 176.

The output of summing unit 176 is supplied to a register 180.

As noted above, the FIR digital filter has a different gain for each selected delay. The gain is corrected by a gain correction multiplier 184. The summing units 172, 174 and 176 correspond to the summing unit 86 shown in FIG. 2. The gain correction multiplier 184 receives the output data sample of the FIR filter from register 180. The gain correction value stored in control RAM 170 is supplied to gain correction multiplier 184 through registers 186 and 188. The output of gain correction multiplier 184, which is the gain corrected output data sample, is stored in a register 190. The required gain correction values are shown in Table I.

It is noted that Tables I and II contain different sets of coefficients and control bits, respectively, for a high band delay of ½ the sampling period. These values are used when the highest frequency components of the received signal are close to ½ the sampling rate. The different values are required because the FIR digital filter amplitude response rolls off at high frequencies. The high band coefficients boost the high frequency response of the FIR digital filter at the expense of ripple in the pass band. Thus, for example, when the sampling rate is 40 MHz, the standard coefficients can be utilized for received signals having frequency components up to about 12 MHz. The high band coefficients extend the usable range up to about 15 MHz. The FIR digital filter with six stages provides satisfactory operation when the highest component frequency of the received signal is no greater than about ⅜ of the sampling rate. For operation close to ½ of the sampling rate, an FIR digital filter with more than six stages is required.

The delay interpolator shown in FIG. 3 and described above has a pipeline structure for high speed operation. The pipeline structure permits operation at a typical clock frequency of 40 MHz. In a pipeline structure, different stages perform different operations simultaneously. The operations required to multiply the input data samples by the filter coefficients (without the use of multipliers in FIG. 3) are performed in a first pipeline stage, and the results are stored in pipeline registers 108, 120, 146 and 164. The summation of the multiplied values is performed in a second pipeline stage by summing units 172, 174 and 176, and the results are stored in pipeline register 180. The gain correction is performed in a third pipeline stage by gain correction multiplier 184, and the results are stored in pipeline register 190. The registers 186 and 188 synchronize the control bits supplied to the first pipeline stage with the gain correction values supplied to the third pipeline stage. For a given set of data values, multiplication is performed in the first pipeline stage during a first clock cycle, summation is performed in the second pipeline stage during a second clock cycle, and gain correction is performed in the third pipeline stage during a third clock cycle. Operations are performed simultaneously by each stage on different sets of data values to provide high speed operation. It will be understood that pipeline operation may not be necessary for operation at lower sampling rates.

The delay interpolator shown in FIG. 3 and described above is preferably implemented in a large scale integrated circuit using commercially available logic optimization software. It will be understood that the actual circuit configuration after logic optimization may differ from that shown in FIG. 3, but will implement the set of filter coefficients listed in Table I. In general, many different circuits may be used to implement the set of filter coefficients listed in Table I, and the circuit shown in FIG. 3 is only one example. Furthermore, other sets of filter coefficients may be utilized within the scope of the present invention. The important point is that filter coefficients of the form $\frac{1}{2}^m$ can be implemented without the use of multipliers, thereby simplifying the required circuitry.

Thus far, the present invention, which comprises an FIR digital filter with selectable delays for delay interpolation, has been described in connection with formation of a single receive beam. According to another important aspect of the invention, the FIR digital filter delay interpolator is used in a time multiplexed parallel beamformer. The time multiplexed parallel beamformer is used to form two or more receive beams simultaneously rather than replicating the beamformer circuitry for parallel operation. The single beamformer is operated in a time multiplexed manner to form multiple beams simultaneously. Thus for example, a sample of a first beam is processed during a first clock cycle, a sample of a second beam is processed during a second clock cycle, a sample of a third beam is processed during a third clock cycle, a sample of a fourth beam is processed during a fourth clock cycle, a second sample of the first beam is processed during a fifth clock cycle, etc.

The FIR digital filter delay interpolator can be utilized in a time multiplexed beamformer for simultaneous processing of multiple beams because it does not contain internal feedback. An infinite impulse response (IIR) digital filter would not be suitable for this application because it contains feedback.

The FIR digital filter shown in FIG. 3 and described above can be used in a time multiplexed beamformer. The circuitry of the first pipeline stage performs operations (multiplication of input samples by filter coefficients) for a first beam, the second pipeline stage performs summation operations for a second beam and the third pipeline stage performs gain correction operations for a third beam, all operations occurring simultaneously. Since there is no feedback in the FIR digital filter, the data for each beam is processed independently.

Figure 4:
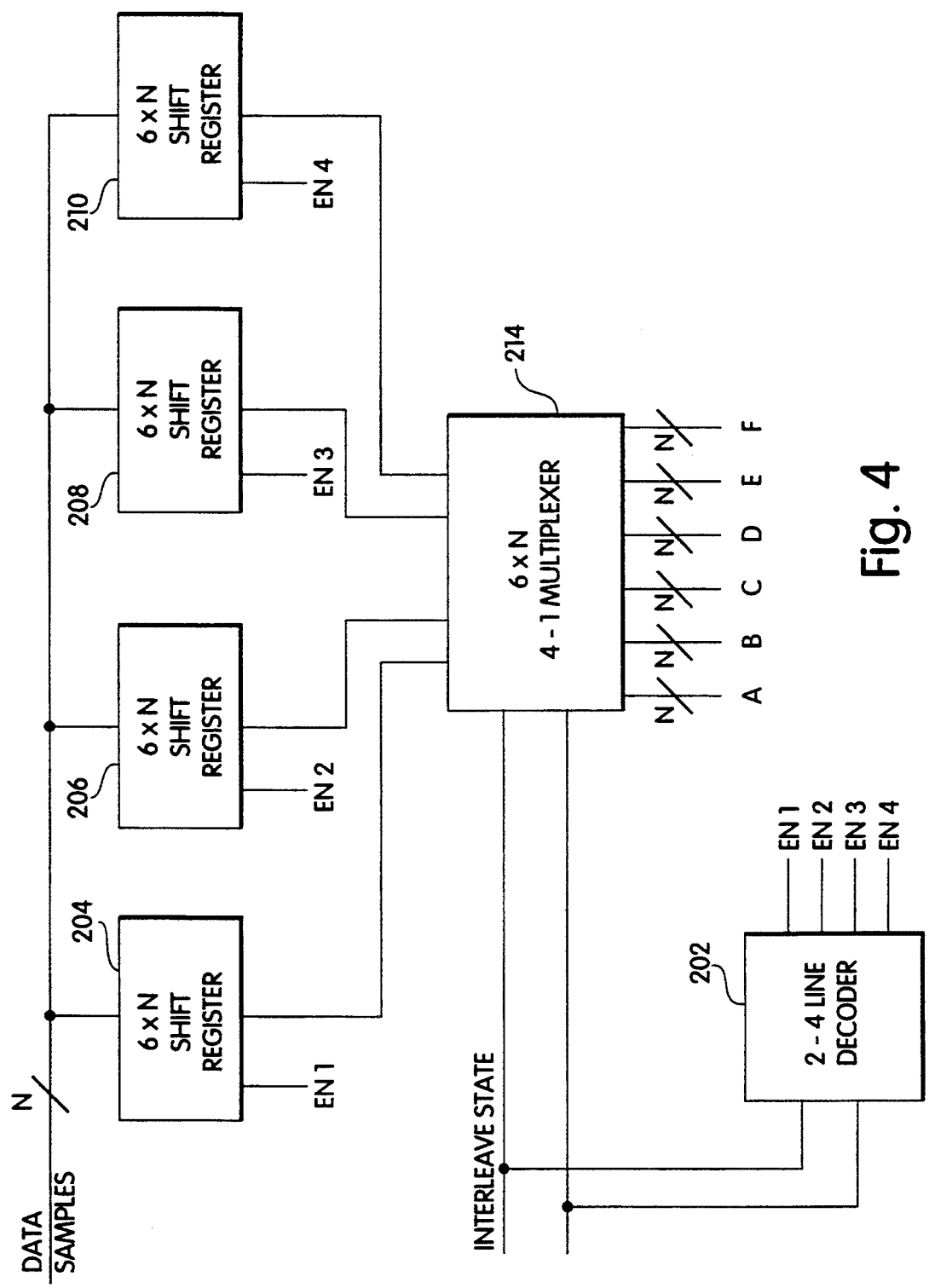
FIG. 4 is a block diagram of storage and multiplexing circuitry for operation of the delay interpolator in a time multiplexed beamformer.

A circuit for supplying groups of input data samples to the FIR filter for time multiplexed operation is shown in FIG. 4. In the example of FIG. 4, four beams are processed simultaneously. The input data samples are time multiplexed for four beams as a result of different delays applied by coarse delay 22 (FIG. 1) to data samples in different time slots. Each beam has a separate set of delays for steering and focusing the beam to a desired point.

The time multiplexed input data samples are synchronized to an Interleave State signal, which may be two bits for a four beam system. The Interleave State signal is decoded by a two-to-four line decoder to provide enable signals EN1, EN2, EN3 and EN4. The enable signals indicate which beam is being processed at any instant of time. Thus, for example, when enable signal EN1 is active, the input data sample represents the first beam. The data samples are input in parallel to shift registers 204, 206, 208 and 210. Each of the shift registers includes six stages, each of N bits, where N is the number of bits in each data sample. The shifting of data samples into registers 204, 206, 208 and 210 is controlled by enable signals EN1, EN2, EN3 and EN4. Thus, during a first clock cycle, enable signal EN1 is active, and a data sample representative of a first beam is loaded into register 204. During a second clock cycle, enable signal EN2 is active, and a data sample representative of a second beam is loaded into shift register 206. During a third clock cycle, enable signal EN3 is active, and a data sample representative of a third beam is loaded into shift register 208. During a fourth clock cycle, enable signal EN4 is active, and a data sample representative of a fourth beam is loaded into shift register 210. This process is repeated continuously so that each of the shift registers contains six consecutive samples of one of the four beams. Thus, register 204 contains six consecutive samples of the first beam, register 206 contains six consecutive samples of the second beam, etc.

The outputs of registers 204, 206, 208 and 210 are supplied to four-to-one multiplexer 214. Each of the four inputs of multiplexer 214 contains six data samples, each of N bits. The multiplexer 214 is controlled by the Interleave State signal. The output of multiplexer 214 is six data samples A–F, each of N bits, representative of one of the time multiplexed beams. The data samples A–F from multiplexer 214 are supplied to the inputs of the FIR digital filter delay interpolator (FIG. 2 or FIG. 3). Thus, time multiplexed data is supplied to the inputs of the delay interpolator.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In an ultrasound beamformer wherein received signals from plural transducer elements of a transducer array are converted to digital samples at a sampling frequency f, the digital samples are delayed by selected delays and the delayed digital samples are summed to form a focused received beam, a delay interpolator for delaying the digital samples in each channel by selected delays that are quantized in increments less than the sampling period 1/f, comprising:

an FIR digital filter including programmable means responsive to delay control information representative of filter coefficients for delaying the digital samples by different delays that are quantized in increments less than the sampling period; and control means responsive to a delay control signal representative of a desired delay for supplying said delay control information to said FIR digital filter, wherein one or more of said filter coefficients are of the form $\frac{1}{2}^m$, where m is an integer, and wherein said FIR digital filter comprises means for multiplying consecutive ones of said digital samples by respective ones of said filter coefficients by shifting the bits of said digital samples by m bit positions in response to said delay control information, to provide intermediate samples, said FIR digital filter further comprising summing means for summing said intermediate samples to provide output samples.

2. A delay interpolator as defined in claim 1 wherein said control means comprises a random access memory for supplying the delay control information to said FIR digital filter in response to said delay control signal.

3. A delay interpolator as defined in claim 2 further including gain correction means for correcting the gain of said output digital samples at each selected delay and wherein said random access memory provides gain correction information for controlling said gain correction means.

4. A delay interpolator as defined in claim 1 wherein said FIR digital filter has selectable delays of 0, $\frac{1}{4}$, $\frac{1}{2}$ and $\frac{3}{4}$ of the sampling period.

5. A delay interpolator as defined in claim 1 wherein said FIR digital filter has selectable delays of 0, $\frac{1}{4}$, $\frac{1}{2}$ and $\frac{3}{4}$ of the sampling period.

6. A delay interpolator as defined in claim 5 wherein said FIR digital filter includes means for simultaneously processing six consecutive digital samples.

7. A delay interpolator as defined in claim 3 wherein said FIR digital filter has a pipeline structure including means for multiplying said digital samples by said set of filter coefficients during a first sampling period, means for summing said intermediate samples during a second sampling period and means for correcting the gain of said output sample during a third sampling period.

8. A delay interpolator as defined in claim 1 further including a register for holding a group of consecutive digital samples for simultaneous input to said FIR digital filter.

9. An ultrasound beamformer for processing received signals from an array of ultrasound transducer elements, comprising:
   a plurality of processing channels, one coupled to each transducer element of the array, each processing channel comprising:
      digitizing means for converting the received signal to digital samples at a predetermined sampling rate f, and
      delay means for delaying said digital samples by predetermined delays to provide delayed digital samples, said delay means comprising a delay interpolator including an FIR digital filter having programmable means responsive to delay control information representative of filter coefficients for delaying the digital samples by different delays that are quantized in increments less than the sampling period 1/f, wherein one or more of said filter coefficients are of the form $\frac{1}{2}^m$ where m is an integer, and wherein said FIR digital filter comprises means for multiplying consecutive ones of said digital samples by respective ones of said filter coefficients by shifting the bits of said digital samples by m bit positions in response to said delay control information, to provide intermediate samples, said FIR digital filter further comprising summing means for summing said intermediate samples to provide said delayed digital samples;
   summing means for summing said delayed digital samples to form output samples that are representative of a received beam; and
   control means for supplying said delay control information to said delay means in each of said processing channels.

10. An ultrasound beamformer and defined in claim 9, wherein said delay interpolator further includes gain correction means for correcting the gain of said delayed digital samples at each selected delay and wherein said control means provides gain correction information for controlling said gain correction means.

11. An ultrasound beamformer as defined in claim 9 wherein said delay interpolator further includes a register for holding a group of consecutive digital samples for simultaneous input to said FIR digital filter.

12. An ultrasound beamformer as defined in claim 9 wherein said FIR digital filter has selectable delays of 0, $\frac{1}{4}$, $\frac{1}{2}$ and $\frac{3}{4}$ of the sampling period.

13. In an ultrasound beamformer wherein received signals from plural transducer elements of a transducer array are converted to digital samples at a sampling frequency f, the digital samples are delayed by selected delays and the delayed digital samples are summed to form a focused received beam, a delay interpolator for delaying the digital samples in each channel by selected delays that are quantized in increments less than the sampling period 1/f, comprising:
   an FIR digital filter including programmable means responsive to delay control information for delaying the digital samples by different delays that are quantized in increments less than the sampling period;
   control means responsive to a delay control signal representative of a desired delay for supplying said delay control information to said FIR digital filter;
   first means for storing a first group of consecutive digital samples representative of a first beam;
   second means for storing a second group of consecutive digital samples representative of a second beam; and
   selector means for sequentially supplying said first group of consecutive digital samples and said second group of consecutive digital samples to said FIR digital filter such that said FIR digital filter performs time multiplexed processing of digital samples of said first beam and said second beam.

* * * * *